United States Patent Office 2,841,946
Patented July 8, 1958

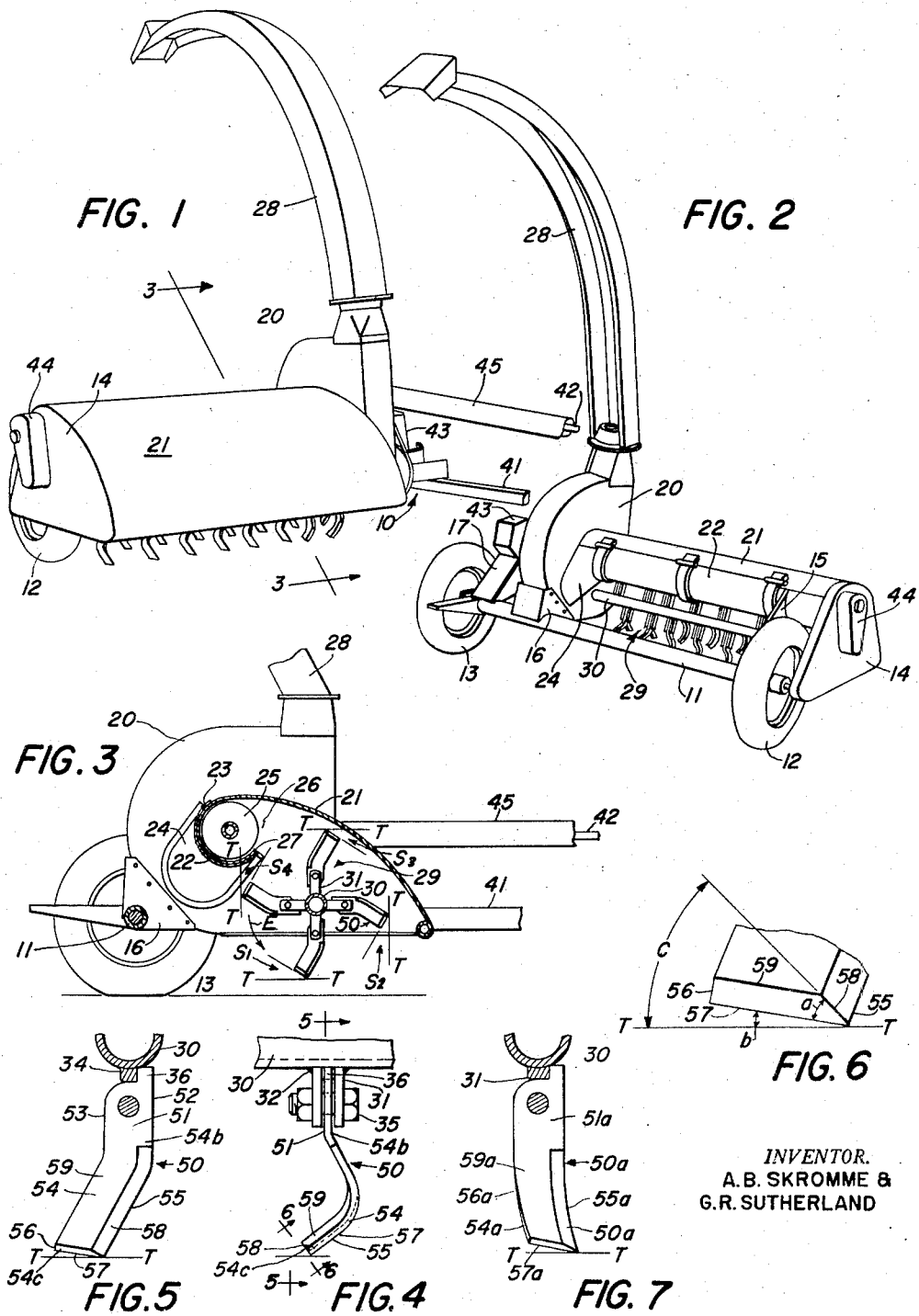

2,841,946

FORAGE HARVESTER KNIVES

Arnold B. Skromme and Gail R. Sutherland, Ottumwa, Iowa, assignors to Deere Manufacturing Co., Dubuque, Iowa, a corporation of Iowa Application January 7, 1955, Serial No. 480,360

9 Claims. (Cl. 56—289)

This invention relates to a forage harvester having a series of axially spaced apart knives or flails that are rotatable about a horizontal axis and that serve both to sever the agricultural crop and to drive the severed material upwardly to a crop-receiving conveyor. More particularly, this invention relates to a new type of knife or flail that has characteristics that aid in both the cutting and lifting actions.

The primary function of a forage harvester is to collect agricultural crops from a field, to treat these crops by reducing them, and to deliver the reduced crops to a crop conveyor which in turn moves them to an awaiting receptacle or wagon trailing the machine. This function is commonly performed by a machine comprising a mobile frame adapted to advance over the field and having crop reducing means of the rotor type as described generally above, which rotor is ordinarily journaled on the frame for vertical adjustment of its horizontal transverse axis of rotation, depending upon the height at which the crop is desired to be severed. In most instances the radial outer ends of the knives are turned axially whereby the leading or cutting edge is disposed transversely to the direction of rotation. This serves not only to increase the effective length of the cutting edge for cutting purposes but also serves to utilize the surface of the blade to aid in the lifting action.

The crop conveyor is also ordinarily disposed transversely to the direction of travel and above and to the rear of the reducing mechanism or rotating knives. A hood extends from a position forwardly of and above the reducing mechanism to a position directly above the auger. The hood serves to confine the severed and reduced crops and to guide them to the conveyor.

In this type of forage harvester known types of rotors are very often unable to pick up all of the crop that is cut and to drive it upwardly into the crop conveyor. Obviously this material that does not reach the crop conveyor falls out of the forage harvester and back to the ground. As will become apparent as the description of the invention unfolds the loss of material or crops back to the ground occurs primarily either because of failure of the rotor to complete its pick-up function, whereby crops drop out of the harvester at the front of the opening at the bottom of the hood, or because of carry-over of crops past the conveyor or through a complete cycle of substantially 360°, whereby the crops are returned to the ground.

It is the primary object of this invention to provide a knife blade having characteristics that reduce the primary causes of crop loss. It is also an object to provide a blade having characteristics that result in a better balanced knife or flail and that will provide better balance to the entire crop reducing rotor which will ultimately reduce vibration of the forage harvester as a unit.

Other functions and objects of the invention will become apparent as the description unfolds in conjunction with the accompanying sheets of drawings.

Fig. 1 is a three-quarter perspective view of the machine as seen from the front and right side.

Fig. 2 is a three-quarter perspective view of the machine as seen from the rear and right side.

Fig. 3 is a longitudinal sectional view as seen along the line 3—3 of Fig. 1.

Fig. 4 is an enlarged front view of the knife blade and knife holder and a portion of the rotor.

Fig. 5 is a side view of the knife blade, with the knife holder and a portion of the rotor in section as seen along line 5—5 of Fig. 4.

Fig. 6 is an enlarged end view of the knife blade as seen along the line 6—6 of Fig. 4.

Fig. 7 is a view similar to Fig. 5 but showing a different form of the knife blade.

The machine comprises a mobile main frame structure 10 including a transverse axle means 11 supported respectively at its right- and left-hand ends by right- and left-hand ground-engaging wheels 12 and 13. The main frame structure also includes a plurality of supporting members 14, 15, 16, and 17, each rigidly affixed at its rear end to the axle means 11 and extending forwardly therefrom as a cantilever arm. The support or cantilever arm 14 is in the form of an end sheet or enclosure positioned at the right-hand side of the machine in transversely spaced relationship to a blower housing 20, and between the two is supported an enclosure or hood means 21. A conveyor trough 22 is mounted on or adjoins the rear portion of the hood means 21 along a transverse edge portion 23 that contains a crop conveyor or auger 25 which delivers leftwardly to the blower housing 20 via a transition 24. The length of the crop conveyor means 22—25 is transverse to the line of advance or direction of travel and the auger receives crops through a transversely elongated intake opening 26 afforded between a front edge 27 of the conveyor trough 22 and the top housing 21 and after transfer to the blower housing 20 exits from that housing via a discharge spout 28.

The machine is adapted to advance over a field under any suitable motive power as by conventional connection to a tractor (not shown) and for that reason, the main frame structure has connected thereto a forwardly extending draft member or tongue 41 and a propeller shaft 42 by means of which power may be supplied to the machine for driving its operative components via suitable gearing (not shown) contained in casings 43, 44 on opposite sides of the harvester. This gearing drives not only the transverse auger conveyor 25 but also crop-reducing means in the form of a rotor designated generally by the numeral 29. A shield 45 is placed over the shaft 42 for safety purposes.

The crop-reducing rotor or crop-collecting means 29 is here shown as comprising a central rotor shaft 30 having a plurality of axially and angularly spaced bifurcated lug members 31 that receive between their furcations shank portions 51 of respective knives or flails 50. Each of the bifurcated lug members 31 is secured to the tubular shaft 30 by welding, as indicated by reference numeral 32, or other suitable means. The knives 50 function not only to sever the crops from the field but to pick up such severed crops. The pick-up function is available on crops previously harvested or otherwise lying detached on the field. The blades are staggered or spirally arranged on the supporting shaft 30. The rotor rotates counterclockwise as indicated by the arrow E in Fig. 3, generating what may be termed a cylinder having a radius measured between the axis of the rotor and the tip of a knife 50. The knives or flails 50 therefore constitute radially projecting portions adapted to sweep forwardly and then upwardly in a front lower quadrant of such cylinder and operate to sever and pick up crops and then to carry the crops upwardly and rearwardly beneath the hood 21 and into the auger trough 22 through the intake opening 26.

Referring now to Figs. 4, 5, and 6, the shank portion 51 of the knife 50 is pivotally secured between the furcations of the bifurcated member 31 by means of a bolt and nut combination 35. The knife itself is made up specifically of the aforesaid shank portion 51 extending radially from the knife holder or bifurcated lug member 31 and has a leading edge 52 and a trailing edge 53. A lug 36 formed integrally with the shank portion 51 is disposed to contact a crossbar 34 extending between the furcations of the bifurcated lug member 31 and serves as one-way stop means limiting swinging of the knife forwardly into the direction of rotation but permitting movement of the knives rearwardly if the blade encounters a stone or other foreign object not readily severable. When mounted, the shank portion is disposed in a plane substantially normal to the axis of rotation of the rotor shaft 30. The knife includes a blade portion 54 which is integral with the shank portion and which has a free outer end 54c spaced radially from the shank portion. The junction of the blade portion 54 with the shank portion 51, as at 54b, may be considered an inner blade part spaced from the free outer end 54c. A cutting edge 55, formed by a ground surface 58 inclined to a pair of substantially parallel blade surfaces 57, 59, extends outwardly from and in a continuing relationship to the leading edge 52 of the shank portion 51 and progressively lags with respect to the direction of rotation from the shank portion to its outer free end. A trailing edge 56 of the blade portion 54 continues radially outwardly from the trailing edge 53 of the shank portion 51. The blade portion 54 is further characterized by, as is shown specifically in Fig. 4, being drawn first to depart to one side of the shank portion and then to the opposite side of the shank portion so that its cutting edge 55 will traverse the plane of the shank portion 51 whereby materials or crops being severed or reduced will cause an overall resultant load substantially in alinement with the plane of the shank portion thereby preventing a torque load on the shank and reducing the tendency for the blade 50 to twist relative to the bifurcated lug or knife holder 31. The blade portion is also turned to cause the parallel blade surfaces 57 and 59 to be inclined to a tangent T—T to the circle described by the path of the outer edge of the cutting edge when the blade is positioned as in Fig. 6.

As previously mentioned the primary function of the rotor is first to sever the crop, second to lift the severed crop, and third to transfer it to the crop conveying unit. It is in the latter two functions that the characteristics of the knife blade 50 will aid. Applying the principle that an inclined surface moving through space, particularly at a high rate of speed, will create a suction immediately to the rear of the surface it is apparent that suction is created by the inclined surfaces 58, 59 of the knife blade 54 as it rotates about its axis. The suction or vacuum created by the inclined surfaces 58, 59, as the knife rotates is immediately filled by surrounding atmosphere which in effect creates drafts as indicated by arrows $S^1$, $S^2$, $S^3$, and $S^4$ in Fig. 3 immediately to the rear of the knives and substantially in the direction of rotation. The crops immediately after being severed will be swept by the blade into the up-drafts, at the forward part of the unit where they will be carried both by the blade and by the up-draft upwardly into the vicinity of the crop conveyor 25. Once the crops are past the front edge of the hood 21 they are confined by the hood against centrifugal departure from the rotor except through the conveyor intake 26, at which zone the shape of the hood permits the rotor-to-conveyor transfer. Hence, the down-draft $S^4$ at the rear of the unit will have little crop-moving effect, inasmuch as the crops will have departed into the conveyor before they reach the back side of the crop reducing rotor.

Referring specifically to Figure 6 which shows the knife in a substantial vertical position, the angle at which the air moves off the surface 58 of the blade, and which will hereafter be referred to as the suction angle $c$, is determined by the included angle between the surface 58 and the tangent T—T which under these circumstances is the horizontal and is in effect the sum of the angle $a$ between the surface 58 and the bottom surface 57 of the blade and the angle $b$ between the tangent T—T and the bottom surface 57 of the blade. In the particular blade shown the angle $a$ is 22° and the angle $b$ 8°, making a total suction angle $c$ of 30°. It should be noted in reference to the suction angle that while a greater suction can be created by increasing the suction angle a practical upper limit has been determined to exist in the proximity of 45°, a suction angle larger than that causing the severed material to hairpin about the blade. Depending somewhat upon the rate of rotation of the blade, the proper range of practicability of the angle $b$ will be 5° to 35° while a proper range for the angle of inclination $a$ between the surface 58 and the blade surface 59 to maintain proper sharpness and proper severing would be from 10° to 30°. However, the sum of the angles $a$ and $b$ or the angle of inclination between the surface 58 and the tangent T—T should not exceed 45° in order to prevent hairpinning.

While the present species of blade has shown the thickness to be sufficient to create its surface 58 to have an effect on the amount of suction behind the blade, in many instances the thickness is of such negligible quantity that the amount of suction created by the surface 58 is of little or no value and the suction angle $c$ is determined entirely by the angular inclination of the surface 57 or of the surface 59 to the tangent T—T, particularly if only the pick-up characteristic of the blade is desired; i. e., if the rotor is not used for severing crops. Under this latter condition the angle $b$ or the angles of inclination of the surfaces 57 and 59 to be tangent T—T will determine the amount of suction and under these circumstances the effective range for the angle $b$ would be 5°, which would be the minimum amount needed to create an effective suction, to 45°, which would be the maximum that the surface could be inclined before creating a condition where hairpinning of the material about the blade would occur.

In many instances the crop material after being severed will hairpin around the cutting edge of the blade. Often this will cause the material to remain on the blade and will prevent departure of the material from the rotor when it reaches the vicinity of the opening 26 proximate to the crop conveying unit 25. This will result in the material continuing in the cycle of the rotor until returned to the ground. It is the purpose of the sweep back or lagging cutting edge to aid in the removal of the material from the blade. The lagging cutting edge 55 will serve to cause any hairpinned material as described above to flow off the blade at its free end.

Figure 7 shows a form of the invention similar to that already described, but lacking the trailing or lagging cutting edge. In this form a knife 50a has a straight shank portion 51a fixed as by welding to the rotor shaft 30. A blade portion 54a, integral with the shank portion 51a and extending radially therefrom, has a leading cutting edge 55a formed by a surface 58a, a trailing edge 56a, and blade surfaces 57a and 59a inclined to a tangent T—T to the circle described by the path of the outer end of the cutting edge 55a. The blade portion 54a is drawn to depart axially first to one side and then to the opposite side of the shank portion 51a in a manner not unlike that shown in Fig. 4. The slight sweeping forward of the cutting edge 55a is a natural curvature caused by the turning of the blade to form the angle between the surfaces 57a and 59a and the tangent T—T. The suction angle of this type of blade is determined in a manner similar to that described in reference to Fig. 6. This type of blade is cheaper to produce and from an economical standpoint offers an advantage. It is, however, less practical for use in a field having a crop with a natural tendency to hairpin about the blade.

What is claimed is:

1. Knife members for use with a crop gathering machine of the type having an arcuate shaped casing with its concavity facing downwardly, a rotating chopping and gathering structure journaled in said casing substantially coaxial therewith and including axially spaced knife holders, and an upper discharge spout communicating directly through an upper portion of the casing, each of said knife members characterized by: a substantially straight shank portion extending radially from and connectible with the knife holder and having a leading edge and a trailing edge and disposed in a plane substantially normal to the axis of rotation; and a blade portion rigidly united to the shank portion transversely disposed relative to the direction of rotation and having an outer free end spaced radially from the shank portion, a cutting edge of the blade portion extending from and in a continuing relationship from the leading edge of the shank portion, and a corresponding trailing edge on the blade portion continuing from the trailing edge of the shank portion, the blade portion being so turned to cause the blade surface from its cutting to its trailing edge to be inclined radially inwardly.

2. Knife members for use with a crop gathering machine of the type having an arcuate shaped casing with its concavity facing downwardly, a rotating chopping and gathering structure journaled in said casing substantially coaxial therewith and including axially spaced knife holders, and an upper discharge spout communicating directly through an upper portion of the casing, each of said knife members characterized by: a substantially straight shank portion extending radially from the knife holder and having a leading edge and a trailing edge and disposed in a plane normal to the axis of rotation; and a blade portion rigidly united to the shank portion and having an outer free end spaced radially from the shank portion, a cutting edge on the blade portion extending radially outwardly from and in a continuing relationship from the leading edge of the shank portion and lagging progressively with respect to the direction of rotation from the shank portion to the outer free end, a corresponding trailing edge on the blade portion continuing from the trailing edge of the shank portion, and being so turned to cause the blade surface from its cutting to its trailing edge to be inclined radially inwardly.

3. Knife members for use with a crop gathering machine of the type having an arcuate shaped casing with its concavity facing downwardly, a rotating chopping and gathering structure journaled in said casing substantially coaxial therewith and including axially spaced knife holders, and an upper discharge spout communicating directly through an upper portion of the casing, each of said knife members characterized by: a substantially straight shank portion extending radially from and connectible with the knife holder and having a leading edge and a trailing edge and disposed in a plane normal to the axis of rotation; and a blade portion rigidly united to the shank portion and having an outer free end spaced radially from the shank portion, a cutting edge on the blade portion extending radially outwardly from and in a continuing relationship from the leading edge of the shank portion and lagging progressively with respect to the direction of rotation from the shank portion to the outer free end.

4. Knife members for use with a crop gathering machine of the type having an arcuate shaped casing with its concavity facing downwardly, a rotating chopping and gathering structure journaled in said casing substantially coaxial therewith and including axially spaced knife holders, and an upper discharge spout communicating directly through an upper portion of the casing, each of said knife members characterized by: a substantially straight shank portion extending radially from and connectible with the knife holder and having a leading edge and a trailing edge; and a blade portion having an inner end rigidly united with the shank portion and departing axially from the shank portion to an outer free end spaced radially from the shank portion, a cutting edge on the blade portion extending radially outwardly from and in a continuing relationship from the leading edge of the shank portion, a corresponding trailing edge on the blade portion continuing from the trailing edge of the shank portion, and said blade portion being so turned to cause the blade surface from its cutting to its trailing edge to be inclined radially inwardly.

5. The invention defined in claim 4, further characterized by the cutting edge extending forwardly with respect to the direction of rotation from the leading edge of the shank portion.

6. The invention defined in claim 4, further characterized by the angle of inclination of the blade surface to the horizontal when the knife member is in a substantial vertical position falling within the range of 5° to 45°.

7. For use in a forage harvester of the type having a rotary cutter in which there is provided a series of axially spaced apart knife holders rotatably driven about a horizontal axis and associated knife members connected to the knife holders so that the knife members will extend radially outwardly as the cutter rotates in an operative direction, each of said knife members characterized by: a substantially straight shank portion extending radially from the knife holder and having a leading edge and a trailing edge; and a blade portion having an inner part rigidly united with the shank portion departing axially from the shank portion to an outer free end spaced radially from the shank portion and a pair of substantially parallel blade surfaces, a cutting edge formed by an inclined surface relative to the blade surfaces extending radially outwardly from and in a continuing relationship from the leading edge of the shank portion, a corresponding trailing edge on the blade portion continuing from the trailing edge of the shank portion, and said blade portion being turned to cause the blade surface from its cutting to its trailing edges to be inclined radially inwardly.

8. The invention defined in claim 7, further characterized by the angle of inclination between the inclined surface and the blade surface being within an angular range of 10° to 30° and the angle of inclination between the blade surface and the horizontal when a knife member is substantially vertical being within an angular range of 5°–35°.

9. The invention defined in claim 8, in which the angle of inclination between the inclined surface and the blade surface and the angle of inclination between the blade surface and the tangent to the cutting edge complement one another whereby the angle between the inclined surface and the horizontal when a knife member is substantially vertical is within an angular range of 15° to 45°.

References Cited in the file of this patent

UNITED STATES PATENTS

| | | |
|---|---|---|
| 1,103,219 | Ogden | July 14, 1914 |
| 2,200,374 | Poese | May 14, 1940 |
| 2,590,065 | Mott | Mar. 18, 1952 |
| 2,684,022 | Smithburn | July 20, 1954 |
| 2,777,268 | Breed | Jan. 15, 1957 |

FOREIGN PATENTS

| | | |
|---|---|---|
| 516,114 | Germany | Jan. 19, 1931 |
| 638,459 | Germany | Nov. 16, 1936 |